United States Patent [19]

Hsaio et al.

[11] Patent Number: 5,100,752

[45] Date of Patent: Mar. 31, 1992

[54] PROCESSES FOR THE PREPARATION OF PHTHALOCYANINES FOR ELECTROPHOTOGRAPHY

[75] Inventors: Cheng-Kuo Hsaio; Ah-Mee Hor; Giuseppa Baranyi, all of Mississauga; Terry L. Bluhm, Oakville; James F. Duff; George Liebermann, both of Mississauga; Eric B. Wasmund, Hamilton, all of Canada

[73] Assignee: Xerox Corporation, Stamford, Conn.

[21] Appl. No.: 519,984

[22] Filed: May 7, 1990

[51] Int. Cl.$^5$ .............................................. G03G 5/06
[52] U.S. Cl. .................................... 430/135; 540/162
[58] Field of Search ...................... 540/122; 430/135

[56] References Cited

U.S. PATENT DOCUMENTS

| | | | |
|---|---|---|---|
| 3,357,989 | 12/1967 | Byrne et al. | 540/122 |
| 3,492,309 | 1/1970 | Ossanna | 540/122 |
| 3,594,163 | 7/1971 | Radler | 540/122 X |
| 3,816,118 | 6/1974 | Byrne | 435/78 |
| 4,426,434 | 1/1984 | Arishima et al. | 430/128 |
| 4,443,528 | 4/1984 | Tamura et al. | 430/56 |
| 4,814,441 | 3/1989 | Hauser et al. | 540/122 |

FOREIGN PATENT DOCUMENTS

| | | | |
|---|---|---|---|
| 183757 | 10/1983 | Japan | 540/122 |
| 20969 | 2/1985 | Japan | 540/122 |

*Primary Examiner*—Roland Martin
*Attorney, Agent, or Firm*—E. O. Palazzo

[57] ABSTRACT

A process for the preparation of x-metal free phthalocyanine which comprises (i) initially preparing a mixture of alpha- and x-metal free phthalocyanines from alpha-phthalocyanine with a grinding or mixing device, (ii) converting the above mixture to x-metal free phthalocyanine by the addition of an organic solvent, (iii) separating the x-metal free phthalocyanine therefrom, and thereafter washing the x-metal free phthalocyanine with a basic solution.

15 Claims, 1 Drawing Sheet

PROCESSES FOR THE PREPARATION OF PHTHALOCYANINES FOR ELECTROPHOTOGRAPHY

BACKGROUND OF THE INVENTION

This invention is generally directed to processes for the preparation of phthalocyanines, and more specifically to processes for the preparation of x-metal free phthalocyanine. In one embodiment, the present invention relates to a simple, economical process for the preparation of x-metal free phthalocyanine photogenerating components by, for example, a pigment grinding method inclusive of attrition and subsequent washing. In accordance with an embodiment of the present invention, the process thereof comprises the polymorphic conversion of alpha-metal free phthalocyanine ($\alpha$-$H_2Pc$) to x-metal free phthalocyanine (x-$H_2Pc$) by a pigment grinding method whereby the resulting phthalocyanine, which is obtained in a high purity of, for example, equal to or greater than 97 percent, can be selected as a photogenerating pigment, especially as an infrared photogenerating pigment in layered photoresponsive imaging members, which members are comprised of charge or hole transport layers comprised of, for example, aryl amines as illustrated in U.S. Pat. No. 4,265,990 and copending application U.S. Ser. No. 215,099, the disclosures of which are totally incorporated herein by reference. The aforementioned photoresponsive or photoconductive imaging members can be selected for various electrophotographic imaging and printing processes, especially xerographic processes wherein, for example, latent images are formed thereon followed by development and transfer to a suitable substrate.

Processes for the preparation of x-metal free phthalocyanine are known. However, these processes are in most instances time consuming, or not effectively and commercially scalable, and the electrical characteristics of the x-metal free phthalocyanine formulated with such processes may be undesirable or inferior than what is needed for photogenerating pigments. In U.S. Pat. No. 3,357,989, the disclosure of which is totally incorporated herein by reference, there is described a milling process for converting alpha-metal free phthalocyanine to x-metal free phthalocyanine by prolonged grinding of the dry alpha-form material. The aforementioned process is not considered suitable for large scale manufacturing purpose since, for example, this process would require extensive time periods, that is several weeks, and correspondingly high consumption of energy for completing the conversion in addition to a reproducibility problem encountered because of the inhomogeneous nature of grinding dry material. More specifically, in the '989 patent it is indicated that a metal free phthalocyanine may be converted to the x form by heat milling or salt milling alpha phthalocyanine for a sufficient time, reference for example column 3, beginning at around line 18, and the working Examples, columns 3 and 4. In column 4, beginning at line 50, it is indicated that any grinding process may be used to convert the alpha or beta metal free phthalocynine to the x polymorph, processes including ball milling with ceramic or metallic balls, salt milling and the use of spex mixer mill which is not believed to be attritor but rather is a shaker containing one steel ball and is primarily used by dentists for mixing purposes; and washing with water, see Example 1. Another method for the preparation of x-metal free phthalocyanine is illustrated in U.S. Pat. No. 3,594,163, the disclosure of which is totally incorporated herein by reference, which comprises mixing alpha-metal free phthalocyanine with a portion of x-metal free phthalocyanine in an aliphatic organic solvent and maintaining the mixing until alpha-metal free phthalocyanine is converted to the corresponding x-form material. The x-metal free phthalocyanine produced by this method, however, has some disadvantages in that, for example, the xerographic properties thereof, such as lower photoactivity, render the material less useful as a photoconductor component in electrophotographic applications. Also, in U.S. Pat. No. 3,932,182 there is described the conversion of alpha-metal free phthalocyanine to the x-form by heating ultra thin evaporated films, about 1,400 Angstroms thick, of alpha form to 450° C. Disadvantages resulting with the aforementioned process reside in the generation of small amounts of x-metal free phthalocyanine on large surface areas about, that is for example 0.25 gram of x-metal phthalocyanine can be prepared on the surface of one square centimeter, the process is not cost effective for producing large quantities of x-metal free phthalocyanine as it would involve expensive vacuum evaporator, high heating cost and lengthy process times. The aforementioned disadvantages are avoided, or minimized with the processes of the present invention wherein, for example, large quantities, that is for example 10 pounds or more of x-metal free phthalocyanine with excellent xerographic properties, such as low dark decay, high photosensitivity and stable cycling, can be obtained can be obtained for electrophotographic processes.

In a patentability search report, in addition to the U.S. Pat. No. 3,357,989 patent mentioned herein there were located as references illustrative of the prior art U.S. Pat. Nos. 3,492,309; 3,816,118; 4,426,434 and 4,443,528. Additionally, in U.S. Pat. No. 4,814,441, the disclosure of which is totally incorporated herein by reference, there is illustrated a novel x-phthalocyanine with specific characteristics which is obtained by preparing alpha phthalocyanine by intensive dry milling into a mixture which consists of the alpha phthalocyanine in the x modification with the content of the x-phthalocyanine being from about 40 to about 75 percent by weight based on the weight of the mixture, which mixture is then heat treated with a solvent, see column 1, beginning at line 25, and continuing on to column 2. As is indicated in column 1 of the '441 patent, beginning at line 45, the dry milling process is advantageously carried out in the mill, for example a ball mill, rotary mill and the like, and that alcohols and particularly alkanols such as methanol, propanol are suitable for the solvent treatment, see column 1, beginning at line 50. It is also indicated in column 1, beginning at line 65, that in order to suppress the formation of beta phthalocyanine it has been proven advantageous in some cases to carry out the treatment with the inert organic solvent also in the presence of water, the amount of water being from 20 to 60 percent by weight based on the liquid system. The resulting x-phthalocyanines have advantages in the coatings sector, see column 4, beginning at line 45, and further the pigments may be used for printing inks, reference column 4, beginning at line 50.

In U.S. Pat. No. 4,508,803, the disclosure of which is totally incorporated herein by reference, there is described an improved photoresponsive device comprised of a supporting substrate, a hole blocking layer, an optional adhesive interface layer, an inorganic photogenerating layer, a photoconducting composition layer comprised of benzyl fluorinated squaraine compositions, and a hole transport layer. Other representative patents disclosing photoconductive devices with squaraine components therein include U.S. Pat. Nos. 4,507,408; 4,552,822; 4,559,286; 4,507,480; 4,524,220; 4,524,219; 4,524,218; 4,525,592; 4,559,286; 4,415,639; 4,471,041 and 4,486,520. The disclosures of each of the aforementioned patents are totally incorporated herein by reference.

The x-metal free phthalocyanines obtained with the process of the present invention can be selected as a photogenerating pigment in the above-mentioned layered photoresponsive imaging members, and other similar imaging members.

SUMMARY OF THE INVENTION

It is, therefore, an object of the present invention to provide processes for the preparation of phthalocyanines with many of the advantages illustrated herein.

It is another object of the present invention to provide processes for the preparation of phthalocyanines with a certain desired crystalline form.

A further object of the present invention is the provision of processes for the preparation of x-metal free phthalocyanines of high purity, equal or exceeding in some instances about 97 percent.

In yet another specific object of the present invention there are provided simple, economical processes for the preparation of x-metal free phthalocyanines which are sensitive to light of wavelength of from about 500 to about 850 nanometers.

Additionally, in a further object of the present invention there are provided processes for the preparation of x-metal free phthalocyanines with excellent photoconductive properties.

Moreover, in a further object of the present invention there are provided processes for the rapid, substantially less than several days required by the dry milling process, preparation of x-metal free phthalocyanines with excellent photoconductive properties by grinding, including attrition of the appropriate phthalocyanines, such as alpha-metal free phthalocyanine, and subsequent washing.

In still another object of the present invention there are provided efficient, economical processes for the preparation of x-metal free phthalocyanines in high yields, equal or greater, for example, than 90 percent in some embodiments, and with a surface area of 60 $m^2$/gram.

A further object of the present invention is the provision of photoconductive imaging members comprised of x-metal free phthalocyanines obtained by pigment grinding washing processes illustrated herein.

Another object of the present invention resides in the provision of organic layered photoconductive imaging members containing therein x-metal free phthalocyanines obtained by the pigment grinding washing processes illustrated herein and hole transport layers.

In yet another specific object of the present invention there are provided negatively charged layered photoresponsive imaging members comprised of x-metal free phthalocyanines photogenerating pigments obtained by the processes illustrated herein, optionally dispersed in a resinous binder, and in contact therewith a hole transport layer comprised of aryl amine molecules.

There are provided in another object of the present invention positively charged layered photoresponsive imaging members with a top photogenerating layer comprised of x-metal free phthalocyanine photogenerating pigments obtained by the pigment grinding washing processes, including attrition processes illustrated herein, optionally dispersed in a resinous binder, and thereunder a hole transport layer preferably comprised of aryl amine molecules.

In another object of the present invention there are provided economical, scalable processes for the conversion of alpha metal phthalocyanine to x-metal free phthalocyanine with excellent photoconductive properties, and wherein in an embodiment of the present invention the x-metal phthalocyanine has removed therefrom detrimental impurities by a washing step accomplished in a basic solution.

Further, in yet another object of the present invention there are provided imaging and printing methods with the improved photoresponsive imaging members illustrated herein.

Also, in a further important object of the present invention there are provided layered photoconductive imaging members sensitive to light of wavelength ranging from about 500 to about 850 nanometers.

These and other objects of the present invention are accomplished by the provision of processes for the preparation of phthalocyanines. In one embodiment the present invention is directed to processes for the preparation of x-metal free phthalocyanines by a pigment grinding washing process. More specifically, the process of the present invention in one embodiment comprises the grinding of alpha-metal free phthalocyanine to form a mixture of alpha- and x-metal free phthalocyanine; adding a solvent, such as an organic solvent, to the resulting ground mixture; separating the resulting desired x-metal free phthalocyanine product; and thereafter washing the product in a basic solution.

One embodiment of the present invention is directed to a process for the preparation of x-metal free phthalocyanine which comprises (i) initially preparing a mixture of alpha- and x-metal free phthalocyanines from alpha-phthalocyanine with a grinding or mixing device; (ii) converting the above mixture to x-metal free phthalocyanine by the addition of an organic solvent; (iii) separating the x-metal free phthalocyanine from the solvent and thereafter washing the x-metal free phthalocyanine with a basic solution prior to drying. Generally, when the mixture is comprised of from about 15 to about 90, and preferably from about 15 to about 60 percent of the x-metal free phthalocyanine and from about 85 to about 10 percent of the alpha-phthalocyanine, the organic solvent is added to the mixture, examples of which include methyl ethyl ketone, cyclohexanone, and the like. While the pigment suspension mixture may be agitated for any effective period of time, usually agitation is accomplished for about 1 to about 24 hours in the attritor ball mill apparatus or by stirring, and wherein the grinding media contained in the attritor or ball mill can be any suitable substance for this purpose including known steel balls, stones, ceramine balls, glass beads and the like. The pigment suspension is then filtered by known techniques, followed by washing the pigment with a basic solution comprised, for example, of ammonium or sodium hydroxide containing a methanol solvent. Subsequent to drying, there is obtained x-metal phthalocyanine of high purity, exceeding or greater than 95 percent in some embodiments, enabling such product to be particularly useful as a photogenerating pigment and layered photoresponsive imaging member as illustrated here. Although it is not desired to be limited by theory, it is believed that the basic solution washing step removes detrimental acidic and other unknown impurities, which if present can degrade the xerographic electrical properties of the x-metal free phthalocyanine by, for example, lowering the charging thereof, causing undesirable electrical potential and the like. Yields of the x-metal free phthalocyanine with the process of the present invention are excellent, exceeding 90 percent, and in many instances the yields were 95 to about 97 percent while the percent conversion of alpha to x-metal free phthalocyanine was in excess of 90 percent, and typically was about 95 to about 100 percent in embodiments of the present invention.

Alpha-metal free phthalocyanines suitable for conversion to x-form in accordance with the processes of the present invention may be prepared by many conventional known methods. For example, there may be selected for the preparation of metal free phthalocyanines the processes described by F. H. Moser and A. L. Thomas in "The Phthalocyanines, Volumes I and II", CRC Press Inc., Florida, 1983, the disclosure of which is totally incorporated herein by reference. There exists two general methods for preparing alpha metal free phthalocyanine: (1) direct synthesis and (2) indirect two step synthesis. In one of the direct synthesis methods, metal free phthalocyanine is obtained by heating phthalonitrile or 1,3-diiminoisoindoline in high boiling solvents such as dimethylaminoethanol, methylnaphthalene or dioxane. The indirect two step synthesis involves the formation of alkali metal phthalocyanine as the intermediate which is then demetallized by washing with acid or methanol to form metal free phthalocyanine. Examples of these methods are illustrated in U.S. Pat. Nos. 2,116,602 and 2,214,454, the disclosures of which are totally illustrated herein by reference. The metal free phthalocyanine pigment synthesized by either of the two methods can be dissolved in concentrated sulfuric acid and the solution formed mixed with water to effect the precipitation of finely divided alpha-metal free phthalocyanine. The alpha-metal free phthalocyanine was filtered off, washed and dried. Commercially available metal free phthalocyanine materials, for example Monolite Fast Blue GS, C.I. Pigment Blue 16, can also be used to prepare the alpha-metal free phthalocyanine subsequent to suitable purification process as mentioned in U.S. Pat. No. 3,357,989, the disclosure of which is totally incorporated herein by reference.

An aspect of the present invention resides in the initial grinding of the alpha-metal free phthalocyanine until a mixture of alpha- and x-metal free phthalocyanine is produced, which mixture comprises about 15 to about 60 weight percent of the x-form, and from about 85 to about 40 weight percent of the alpha-form, based on the mixture. A suitable solvent is then added to the mixture and agitation of the pigment suspension continues for an effective period of time, for example from 1 to about 24 hours, to effect the conversion to the x-metal free phthalocyanine. The resulting x-metal free phthalocyanine is separated from the solvent by filtration, washed with a basic solution and solvent, and dried. X-ray diffraction analysis indicated that the final material contains at least 97 percent of x-metal free phthalocyanine in an embodiment of the present invention.

Various commercial pigment grinding or mixing equipment can be selected for the initial conversion of alpha-metal free phthalocyanine to a mixture of alpha- and x-forms. Examples are ball mill, attritor, planetary mill, sand mill, turbula shaker-mixer, and the like. Grinding media are preferably comprised of materials with hard, long-wearing and abrasion-resistant surfaces, and can be in the round, spherical, or cylindrical forms. Examples of the aforementioned materials are steel balls, round agate and stones, zirconium oxide cylinders and balls, alumina spheres and mixtures thereof.

The specific operation parameters for each grinding method depends, for example, on the type of equipment used in the conversion. As illustrated in Example II, the ball milling of 10 grams of dry alpha-metal free phthalocyanine with steel balls was initially accomplished for about 48 hours until a 30 percent of alpha-form had been converted to the x-form. Alternatively, an attritor can provide a more efficient grinding effect in an embodiment of the present invention as illustrated in Example IV, wherein the grinding of the same amount, 10 grams of dry alpha-metal free phthalocyanine with an attritor, generated about 60 percent of the x-form in a shorter time, about 2 hours.

After the mixture of alpha- and x-metal free phthalocyanines in which the x-form amounts to about 15 to 90 weight percent as determined by x-ray analysis has been obtained by the aforementioned grinding or mixing processes, an organic solvent is added to the mixture and the pigment suspension thus formed is agitated by continuing the grinding processes. Alternatively, the pigment suspension can be removed from the grinding or mixing apparatus and transferred to a vessel wherein the pigment suspension can be agitated by a motor driven propeller, a magnetic stirrer, or other means of agitation technique. Organic solvents such as alcohols, ketones, esters, ethers, tetrahydrofuran, halogenated hydrocarbons, acetonitrile, or mixture thereof can be added to the mixture of alpha- and x-metal free phthalocyanines to form the pigment suspension. The amount of the solvent or solvent mixture is generally from about 10 to 30 times the weight of metal free phthalocyanine used in the conversion, thus enabling, for example, the pigment suspension to be thoroughly and easily agitated.

Subsequent to from about 1 to about 20 hours of agitation, the pigment suspension can be removed from the grinding apparatus by filtration, decantation, or suction, and the like. The pigment suspension is then passed through a filtration apparatus and x-metal free phthalocyanine is isolated and collected on the filter. The x-metal free phthalocyanine product pigment is optionally washed with organic solvents such as alcohols or ketones. The metal free phthalocyanine is then slurried and washed with a basic solution at least once. The amount of basic solution selected is from about 5 to 20 times the weight of metal free phthalocyanine. The basic solution can be prepared by dissolving ammonium hydroxide, sodium hydroxide, potassium hydroxide, and the like in water or an alcohol, such as methanol.

Subsequent to the aforementioned basic washing step, the x-metal free phthalocyanine may be further washed with an organic solvent as illustrated herein, such as an alcohol, ketone and the like, primarily for the purpose to remove water and other impurities wherein an effective amount of organic solvent is selected, for example from about 10 to 30 times by weight of the x-metal free phthalocyanine pigment. Thereafter, the x-metal free phthalocyanine pigment can be dried by known techniques including drying in a vacuum oven at from about 50° to about 90° C. for an effective period of time of from about 5 to about 30 hours, these parameters depending, for example, on the amount of product being dried and the like.

Specifically, after the basic washing, the pigment is further washed at least once with an organic solvent such as alcohol or ketone to remove water and impurities. The amount of the organic solvent in each washing is about 10 to 30 times of the weight of the pigment. Finally, the pigment is dried in a vacuum drying oven at 50° to 90° C. for 5 to 30 hours depending on the amount of pigment being dried. X-ray diffraction analysis evidences that the resulting x-metal free phthalocyanine pigment is at least about 97 percent converted from the alpha-metal free phthalocyanine in an embodiment of the present invention.

Various known pigment grinding or mixing methods can be selected as indicated herein for accomplishing the pigment polymorphic conversion process of the present invention, two preferred methods are ball milling and attrition.

In the ball milling conversion of alpha- to x-H$_2$Pc there can be selected a plastic jar, half filled with flint stones, or steel balls. The jar can then be charged with 1 part of alpha-H$_2$Pc and rotated on a jar mill purchased from Norton Company. Forty-eight (48) hours later, a mixture of alpha-and x-metal free phthalocyanines, which comprises from about 20 to 60 weight percent of x-form (x-metal phthalocyanine) as determined from x-ray analysis, can be obtained. From about 10 to 20 parts of solvent, such as methyl ethyl ketone or cyclohexanone, can then be added to the pigment mixture in the jar. The resulting pigment suspension can then be ball milled for about 20 hours on the same jar mill. The resulting pigment suspension can then be removed from the jar by, for example, suction or decantation and transferred to a known filtration device. After filtration, the pigment collected on the filter is washed with 10 parts of methanol or acetone. Subsequently, the x-metal free phthalocyanine product pigment can be further washed with a basic solution, in an effective amount, about 10 parts for example, prepared by dissolving from 1 to about 20 percent by weight of ammonium hydroxide, sodium hydroxide or potassium hydroxide into a solvent such as methanol. The aforementioned basic solution washing is preferably repeated two additional times to ensure the removal of detrimental impurities. Following the basic washing, the pigment product can be washed with methanol or acetone in an effective amount, about 10 parts for example, which washing was preferably repeated two more times. The washed, purified pigment x-metal free phthalocyanine product can then be transferred to a vacuum oven operating at a temperature of from about 60° to about 90° C. and dried for an effective period of time of, for example, from about 5 to about 30 hours depending on the amount of the pigment being dried. X-ray analysis indicates that the pigment contains at least 97 percent of x-H$_2$Pc x-metal free phthalocyanine by weight in this embodiment with a yield of 90 percent.

Also, an attritor can be used for the conversion of alpha-H$_2$Pc to x-H$_2$Pc. Specifically, attritors of various capacity available from Union Process Inc. are particularly suitable for executing the process of this invention. A small amount of x-H$_2$Pc, for example from about 10 to about 200 grams, can be conveniently prepared from the alpha-H$_2$Pc using the Model 01 or 1S attritors which have a slurry capacity of from about 0.25 liter to 1 gallon. For preparing kilograms or hundreds of kilograms of x-H$_2$Pc, larger attritors such as the Model 15S, or higher model numbers which have a slurry capacity of 10 gallons or greater, are selected. The range of operation conditions for these attritors is known and are readily available from Union Process Inc. More specifically, a Model 15S attritor is filled with steel balls until the arms of the stirrer are completely covered by the balls. The attritor is then charged with 1 part of alpha-H$_2$Pc pigment, and the pigment grinding is effected by driving the stirrer at a speed of 60 to 200 RPM. A few grams of pigment are withdrawn from the attritor at hourly intervals and analyzed by x-ray diffraction method. When the pigment sample analyzed is found to be comprised of a mixture of alpha-and x-H$_2$Pc containing the x-form in an amount of from about 25 to 70 weight percent, the grinding is ceased. From 10 to 20 parts of methyl ethyl ketone, cyclohexanone, or the like are added to the pigment mixture in the attritor. The agitation of the pigment suspension thus formed can be continued in the attritor by restarting the rotation of the stirrer. More preferably, the pigment suspension accomplished is removed from the attritor and transferred to another vessel wherein the agitation of the suspension is by a motor driven stirrer. The x-H$_2$Pc product pigment is isolated from the pigment suspension by following the same washing, separation and drying procedures as described for the ball milling conversion process illustrated herein. X-ray measurement confirms that the content of the product pigment is greater than 97 weight percent of x-H$_2$Pc.

The x-metal free phthalocyanine obtained with the processes of the present invention can be selected as photogenerating pigments in photoconductive layered imaging members, which members can be comprised of, for example, a supporting substrate, the x-metal free phthalocyanine photogenerating layer, and a transport layer, especially an aryl amine transport.

With further respect to the photoconductive imaging members of the present invention, the purified photogenerating x-metal phthalocyanine can be situated between the supporting substrate and the hole transport layer; or alternatively, the hole transport layer may be situated between the supporting substrate and the layer comprised of an x-metal free photogenerating layer. These imaging members may also include protective overcoatings thereover including polymers such as polyurethanes, polycarbonates and the like with a thickness of from about 0.2 micron to about 10 microns, or other effective thicknesses.

In another specific illustrative embodiment, the photoconductive imaging member is comprised of (1) a supporting substrate; (2) a hole blocking layer; (3) an optional adhesive interface layer; (4) a photogenerating layer comprised of the x-metal free phthalocyanine obtained with the process of the present invention, and (5) a hole transport layer such as an aryl amine. More specifically, this photoconductive imaging member is comprised of a conductive supporting substrate, a hole blocking organo silane or siloxane, or metal oxide layer in contact therewith, an adhesive layer, such as polyester or polyvinylbutyral, a photogenerating layer comprised of the x-metal free phthalocyanine obtained with the processes of the present invention, and thereover certain aryl amines dispersed in a resinous binder.

Various known processes can be selected for the preparation of the photoconductive imaging members, the process parameters and the order of coating of the layers being dependent on the member desired. In one process variant, the layered photoconductive device can be prepared by providing the conductive substrate containing the hole blocking layer and an optional adhesive layer, and applying thereto by solvent coating processes, laminating processes, or other methods, the x-metal free phthalocyanine photogenerating layer, and the charge transport layer comprised preferably of an aryl amine.

The photoconductive imaging members can be incorporated into numerous imaging processes and apparatuses inclusive of those well known in the art such as xerographic imaging and printing processes. Specifically, the imaging members of the present invention, wherein the x-metal free phthalocyanine absorbs light of a wavelength of from about 500 nanometers to about 850 nanometers, are useful in xerographic imaging processes. In these processes, electrostatic latent images are intially formed on the imaging member, followed by development, thereafter transferring the image to a suitable substrate, and fixing the developed image thereto by, for example, heat, a combination of heat and pressure.

DESCRIPTION OF SPECIFIC EMBODIMENTS

Figure 1:
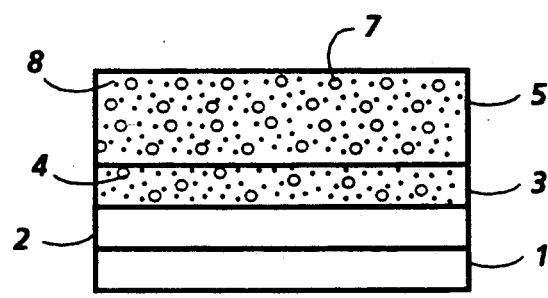
FIG. 1 is a partially schematic cross-sectional view of a photoresponsive imaging member in which the x-metal free phthalocyanine layer is situated between a substrate and a charge transport layer.

Illustrated in FIG. 1 is a photoresponsive imaging member of the present invention comprised of a substrate 1, an adhesive layer 2, a photogenerator layer 3 comprised of the x-metal free phthalocyanine obtained by the process of the present invention optionally dispersed in a resinous binder composition 4, and a charge carrier hole transport layer 5 comprised of an aryl amine such as N,N'-diphenyl-N,N'-bis(3-methylphenyl)[1,1'-biphenyl]-4,4'-diamine 7 dispersed in a polycarbonate resinous binder 8.

Figure 2:
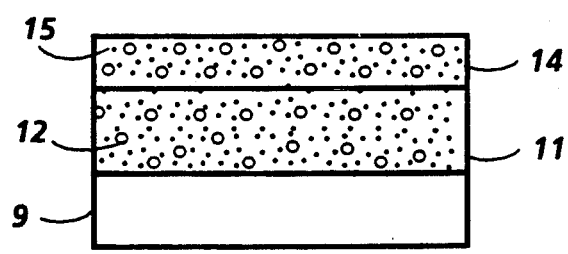
FIG. 2 is a partially schematic cross-sectional view of a photoresponsive imaging member in which a charge transport layer is situated between the x-metal free photogeneration layer and a substrate.

Illustrated in FIG. 2 is a photoresponsive imaging member in which the hole transport layer is situated between the supporting substrate and the photogenerating layer. More specifically, with reference to this Figure there is illustrated a photoconductive imaging member comprised of a supporting substrate 9, a hole transport layer 11 comprised of an aryl amine hole transport composition dispersed in an inactive resinous binder composition 12, and a photogenerating layer 14 comprised of x-metal free phthalocyanine obtained by the process of the present invention illustrated herein optionally dispersed in a resinous binder composition 15.

With further reference to the imaging members, the substrates may comprise a layer of insulating material such as an inorganic or organic polymeric material, including Mylar a commercially available polymer; a layer of an organic or inorganic material having a semiconductive surface layer such as indium tin oxide or aluminum arranged thereon, or a conductive material such as, for example, aluminum, chromium, nickel, titanium, brass, or the like. The substrate may be flexible, seamless or rigid and many have a number of many different configurations, such as for example a plate, a cylindrical drum, a scroll, an endless flexible belt, and the like. Preferably, the substrate is in the form of an endless flexible belt. In some situations, it may be desirable to coat on the back of the substrate, particularly when the substrate is an organic polymeric material, an anticurl layer, such as, for example, polycarbonate materials commercially available as Makrolon. The thickness of the substrate layer depends on many factors, including economical considerations, thus this layer may be of substantial thickness, for example over 100 mils, or of minimum thickness providing there are no adverse effects on the system. In one preferred embodiment, the thickness of this layer is from about 3 mils to about 10 mils.

The optional adhesive layers are typically comprised of a polymeric material including polyesters, polyvinyl butyral, polyvinyl pyrrolidone, polyurethane, polyamide and the like. Typically, this layer is of a thickness of less than about 5 microns. The imaging member can include other layers therein including metal oxide layers, such as aluminum oxide and siloxanes, reference U.S. Pat. No. 4,464,450, the disclosure of which is totally incorporated herein by reference. Generally, the thickness of these layers is from about 0.01 to about 1 micron, however, other thicknesses may be selected.

The layer comprised of x-metal free phthalocyanine photogenerating pigments obtained by the process of the present invention are generally of a thickness of from about 0.05 micron to about 10 microns or more, and preferably are of a thickness of from about 0.1 micron to about 3 microns; however, the thickness of this layer is primarily dependent on the photogenerator weight loading which may vary from about 5 to 100 percent. Various suitable polymeric binders can be selected for the x-metal free phthalocyanine photogenerating layer. Examples of resin binders include polycarbonate, polyesters, polyvinylbutyral, polyvinylacetate, polyvinylcarbazole, polyacrylate, polystyrene, their copolymers and the like. Generally, it is desirable to provide this layer in a thickness which is sufficient to absorb about 90 percent or more of the incident radiation which is directed upon it, and the imagewise or printing exposure step. The maximum thickness of this layer is dependent primarily upon factors such as mechanical considerations, for example, whether a flexible photoconductive imaging member is desired, and the thicknesses of the other layers.

Various suitable hole transport components such as aryl amine charge transport layers can be selected for the photoconductive imaging members, which layer has a thickness, for example, of from about 5 microns to about 75 microns, and preferably is of a thickness of from about 10 microns to about 40 microns. In a preferred embodiment, this transport layer comprises aryl amine molecules of the following formula

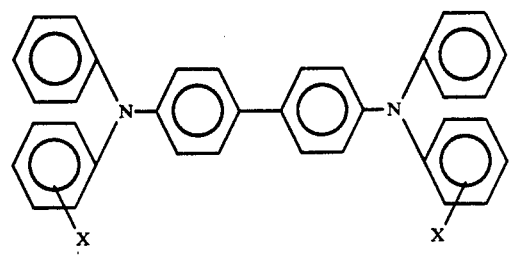

dispersed in a highly insulating and transparent organic resinous binder wherein X is selected from the group consisting of alkyl and halogen, and preferably (ortho) $CH_3$, (meta) $CH_3$, (para) $CH_3$, (ortho) Cl, (meta) Cl, or (para) Cl.

Aryl amines encompassed by the above formula include, for example, N,N'-diphenyl-N,N'-bis(alkylphenyl)-[1,1-biphenyl]-4,4'-diamine wherein the alkyl is selected from the group consisting of methyl such as 2-methyl, 3-methyl, and 4-methyl, ethyl, propyl, butyl, hexyl, and the like. With halo substitution, the amine is N,N'-diphenyl-N,N'-bis(halo phenyl)-[1,1'-biphenyl]-4,4'-diamine wherein halo is 2-chloro, 3-chloro, or 4-chloro.

Examples of the highly insulating and transparent resinous material or inactive binder resinous material for the photogenerating or transport layers include materials such as those described in U.S. Pat. No. 3,121,006, the disclosure of which is totally incorporated herein by reference. Specific examples of organic resinous materials, especially for the transport layer, include polycarbonates, acrylate polymers, vinyl polymers, cellulose polymers, polyester, polysiloxanes, polyamides, polyurethanes, polystyrene and epoxies as well as block, random or alternating copolymers thereof. Preferred electrically inactive binder materials for the charge transport are polycarbonate resins having a molecular weight ($M_w$) of from about 20,000 to about 100,000 with a molecular weight in the range of from about 50,000 to about 100,000 being particularly preferred. Generally, the charge transport layer contains from about 10 to about 75 percent by weight of the charge transport material corresponding to the foregoing formula, and preferably from about 35 percent to about 50 percent of this material.

Also, methods of imaging can be accomplished with the photoconductive imaging members illustrated herein. These methods generally involve the formation of an electrostatic latent image on the imaging member, followed by developing the image with known developer compositions, reference for example U.S. Pat. Nos. 3,590,000; 4,469,770; 4,560,635 and 4,298,672, the disclosures of which are totally incorporated herein by reference; subsequently transferring the image to a suitable substrate; and permanently affixing the image thereto.

The invention will now be described in detail with reference to specific preferred embodiments thereof, it being understood that these examples are intended to be illustrative only. The invention is not intended to be limited to the materials, conditions, or process parameters recited herein. Also, all parts and percentages are by weight unless otherwise indicated.

EXAMPLE I

Following the teaching of U.S. Pat. No. 3,357,989, the disclosure of which is totally incorporated herein by reference, 18 grams of alpha-metal free phthalocyanine was first dissolved into 364 grams of concentrated sulfuric acid. The acid solution was then mixed with water to effect the precipitation of a finely divided pigment determined to be the alpha-form of metal free phthalocyanine by x-ray analysis. The conversion of alpha-$H_2$Pc to x-$H_2$Pc was accomplished in a ball mill (available from Norton Company) using flint stones as a grinding medium. Into a 1,000 milliliter polyethylene bottle, 1,040 grams (g) of flint stones, about ½ to ¾ inch in size diameter, and 15 grams of the alpha-$H_2$Pc pigment were added. The bottle was placed on a pair of rotating rubber rollers. The progress of conversion from alpha-$H_2$Pc to x-$H_2$Pc was monitored by examining the x-ray diffraction patterns of small quantities (0.5 gram) of ground pigment removed from the bottle at selected (24 hours) time intervals. After 5 days of milling, the x-ray analysis indicated that the ground pigment contained 50 weight percent of x-$H_2$Pc and 50 weight percent of alpha-$H_2$Pc. Two hundred and fifty (250) milliliters of methyl ethyl ketone (MEK) were then added to the aforementioned ground pigments and the milling was continued for 20 hours. The pigment suspension formed was poured into a sintered glass funnel and filtered to remove the solvent methyl ethyl ketone. The x-metal free pigment product was then washed with a methanol mixture containing 4 percent of ammonium hydroxide, and methanol, respectively, and the pigment product was then dried in a vacuum oven at 80° C. for 6 hours. X-ray analysis indicated that 98 percent of alpha-$H_2$Pc had been coverted into x-$H_2$Pc. The xerographic evaluation of this x-$H_2$Pc product sample is described in Example III that follows.

EXAMPLE II

Ten grams of alpha-$H_2$Pc pigment obtained as described in Example I and 1.8 killigrams of ¼ inch stainless steel balls were placed in a 500 milliliter polyethylene bottle. The bottle was rotated on a rubber roller mill. After 2 days of milling, the ground pigment (0.5 gram) was removed from the bottle and analyzed by x-ray diffraction method. It was found that the product contained a mixture of 30 weight percent of x-$H_2$Pc and 70 weight percent of alpha-$H_2$Pc. One hundred and eighty (180) milliliters of MEK (methyl ethyl ketone) was then added to the ground mixture in the bottle and the milling was continued for 20 hours. The pigment suspension was then processed in the same manner, including washing, as described in Example I. The final dried pigment contained 100 percent of x-$H_2$Pc (x-metal free phthalocyanine).

The xerographic electrical properties of this x-$H_2$Pc pigment sample were determined as reported in Example III that follows.

EXAMPLE III

Two layered photoreponsive imaging members containing an x-$H_2$Pc photogenerator layer and an arylamine transport layer were fabricated. The pigment dispersion used for coating the photogenerator layer was prepared as follows in each instance: 0.25 gram of polyvinylbutyral polymer was initially dissolved in 14.2 grams of cyclohexanone in a 30 milliliter glass bottle. 0.25 gram of the x-$H_2$Pc pigments of Example I and II, respectively, and 70 grams of ⅛ inch stainless steel balls were added to the polymer solution. The bottle was placed on a roller mill and the dispersion was milled for 20 hours. The solution used for coating the aryl amine transport layer was prepared by dissolving, with the aid of a magnetic stirrer, 4.45 grams of N,N'-diphenyl-N,N'-bis(3-methylphenyl)-[1,1'-biphenyl]-4,4'-diamine, 8.3 grams of polycarbonate in 51.65 grams of toluene in a 120 milliliter bottle.

The x-$H_2$Pc dispersion was in each instance coated onto a 3 mil aluminum metallized Mylar substrate using a film applicator of 1 mil gap. The x-metal free phthalocyanine photogenerator layer formed was dried in a forced air oven at 120° C. for 10 minutes and had a final thickness of about 0.35 micros. The charge transport layer solution was then coated onto the photogenerator layer using a film applicator of 10 mil gap. The resulting member was then dried at 120° C. for 1 hour. The charge transport layer was approximately 25 microns thick.

Xerographic electrical properties of the aforementioned imaging members were then determined by electrostatically charging the surfaces thereof with a corona discharge source until the surface potentials, as measured by a capacitively coupled probe attached to an electrometer, attained an initial value $V_o$ of about −300 volts. After resting for 0.5 second in the dark, the charged members reached a surface potential of $V_{ddp}$, dark development potential, and each member was then exposed to light from a filtered Xenon lamp with an XBO 150 watt bulb. A reduction in surface potential to a $V_{bg}$ value, background potential, due to photodischarge effect was observed. The dark decay in volt/second was calculated as $(V_o - V_{ddp})/0.5$. The percent of photodischarge was calculated as 100 percent $(V_{ddp} - V_{bg})/V_{ddp}$. The desired wavelength and energy of the expose light was determined by the type of filters placed in front of the lamp. The photodischarge characteristics of these imaging members were measured using an narrow-band pass filter of 800 nanometers. A photodischarge curve was then constructed by plotting values of the photodischarge percentage against the corresponding expose energy. From the curve, various photosensitivity values can be determined. Half-discharge energy, commonly designated as $E_{\frac{1}{2}}$ value, is the amount of expose energy required to achieve 50 percent of photodischarge from the dark development potential. The higher the photosensitivity, the smaller is the $E_{\frac{1}{2}}$ value. Additionally, the photodischarge percentages observed at expose energies of 10 and 20 erg/cm² are also used to describe the photosensitivity.

Table 1 summarizes the xerographic electricals of the above prepared imaging members containing the x-H₂Pc photogenerating pigment obtained by the process of Example I and II.

TABLE 1

| | Xerographic Electricals of Ball Milled x-H₂Pc | | | | |
|---|---|---|---|---|---|
| x-H₂Pc Obtained From | Grinding Medium | Dark Decay V/s | $E_{\frac{1}{2}}$ erg/cm² | Percent Discharge At | |
| | | | | 10 erg/cm² | 20 erg/cm² |
| Example I | stone | 11 | 3.7 | 75 | 83 |
| Example II | steel ball | 12 | 3.5 | 74 | 81 |

Both imaging members with the prepared x-H₂Pc pigment samples exhibit low dark decay (<30 v/s) and high photosensitivity (greater than 60 percent discharge at 10 erg/cm²).

EXAMPLE IV

A Model 01 attritor obtained from Union Process Inc. comprised of a 750 milliliter stainless steel grinding tank and a stirrer having a rotating shaft with three pairs of arms was used for this Example. Seventeen hundred (1,700) grams of ⅛ inch stainless steel balls and 10 grams of α-H₂Pc pigment obtained from Example I were added to the Model 01 attritor. The temperature of the attritor was maintained at 25° C. by passing cooling water through its water jacket. The rotating speed of the stirrer was set at 300 rpm and the alpha-H₂Pc pigment was ground for 2 hours, after which 0.5 gram of the ground pigment powder was removed from the attritor. X-ray diffraction analysis evidenced that the removed grounded pigment was comprised of a mixture of about 50 weight percent of alpha-H₂Pc and 50 weight percent of x-H₂Pc. About 180 milliliters of methyl ethyl ketone (MEK) were then added to the above mixture and the pigment suspension formed was further mixed at the same stirrer speed of 300 rpm for 1 hour. The suspension was decanted onto a sintered glass funnel and filtered by vacuum suction to remove methyl ethyl ketone. The pigment powder remaining in the funnel was washed with methanol containing 4 percent of an ammonium hydroxide solution and methanol, respectively. The x-H₂Pc product pigment was dried in a vacuum oven at 70° C. for 8 hours. X-ray diffraction analysis indicated that the pigment mixture was 100 percent converted to x-metal free phthalocyanine.

The above procedure was repeated two more times with the exception that the mixing time after adding methyl ethyl ketone was 2 hours in the first procedure and 20 hours in the second. In both situations, x-ray diffraction results confirmed that the final dried pigment samples were 100 percent of x-H₂Pc.

Xerographic electricals of the above prepared attrited x-H₂Pc pigment samples were tested in accordance with the procedure described in Example III after the preparation of imaging members. The results are summarized in Table 2.

TABLE 2

| Xerographic Electricals of Attrited x-H₂Pc | | | | | |
|---|---|---|---|---|---|
| Conversion Process | | | | Percent | |
| Dry Attrition Time, Hour | Wet Attrition Time, Hour | Dark Decay V/s | $E_{\frac{1}{2}}$ erg/cm² | Discharge At | |
| | | | | 10 erg/cm² | 20 erg/cm² |
| 2 | 1 | 15 | 3.2 | 69 | 77 |
| 2 | 2 | 14 | 4.7 | 67 | 74 |
| 2 | 20 | 26 | 15 | 38 | 59 |

The shorter wet attrition time favors the formation of pigment with high photosensitivity and low dark decay. The attrition technique has substantially reduced the complete polymorphic conversion process time to 3 hours as compared to longer times needed in the ball milling processes desribed in Examples I and III.

EXAMPLE V

Following the procedure described in Example IV, the conversion process was repeated three times except with the modified conditions as follows. In place of MEK, cyclohexanone was added each time to the ground pigment after the initial 2 hours of dry attrition. The three pigment suspensions obtained were further mixed at 2,5 and 20 hours, respectively. After undergoing the same filtration, washing and drying processes, each suspension provided a final pigment product which was determined to be x-H₂Pc, 100 percent, by x-ray analysis.

The xerographic electricals of three x-H₂Pc samples prepared at different attrition times were then determined in accordance with the procedure of Example III after the preparation of imaging members. The results are shown in Table 3.

TABLE 3

| Xerographic Electricals of Attrited x-H$_2$Pc | | | | | |
|---|---|---|---|---|---|
| Conversion Process | | | | Percent Discharge At | |
| Dry Attrition Time, Hour | Wet Attrition Time, Hour | Dark Decay V/s | E$_{\frac{1}{2}}$ erg/cm$^2$ | 10 erg/cm$^2$ | 20 erg/cm$^2$ |
| 2 | 2 | 16 | 4.2 | 71 | 79 |
| 2 | 5 | 14 | 4.6 | 69 | 78 |
| 2 | 20 | 15 | 3.4 | 73 | 81 |

The x-H$_2$Pc samples obtained from the attrition in cyclohexanone exhibited acceptable xerographic electricals such as high photosensitivity (>60 percent discharge at 10 erg/cm$^2$) and low dark decay (30 V/s). The pigment conversion time was substantially shortened in comparison to the ball milling process. Also, unlike the methyl ethyl ketone in Example IV the cyclohexanone does not degrade the xerographic electricals of x-H$_2$Pc with increasing wet attrition time, up to 20 hours, indicating a better, that is a wider range of time processing time latitude for the second step of pigment conversion. This is particularly advantageous for the large scale production purpose where the electrical properties of x-H$_2$Pc do not deteriorate within a reasonable processing time span.

EXAMPLE VI

The pigment conversion experiment described in Example IV was repeated with the exception that the water jacket was maintained at 75° C. After 2 hours of grinding dry alpha-H$_2$Pc pigment, x-ray results indicated that 90 percent of x-H$_2$Pc was obtained. Methyl ethyl ketone was then added to the ground pigment and the mixing was continued for 1 hour resulting in x-metal phthalocyanine with xerographic electricals for the imaging member thereof as follows: dark decay=19 V/s, E$_{\frac{1}{2}}$=3.8 ergs/cm$^2$, values of percent discharge at 10 and 20 erg/cm$^2$ being 72 and 79, respectively.

Other modifications of the present invention may occur to those skilled in the art subsequent to a review of the present application. These modifications including equivalents thereof are intended to be included within the scope of the present invention.

What is claimed is:

1. A process for the preparation of x-metal free phthalocyanine for electrophotographic imaging which consists essentially of (i) initially preparing a mixture of alpha -and x-metal free phthalocyanines from alpha-phthalocyanine with a grinding device or milling, which grinding and milling are accomplished at about 25° C.; (ii) converting the above mixture to x-metal free phthalocyanine by the addition of an organic solvent comprised of a ketone; (iii) separating the x-metal free phthalocyanine therefrom, and thereafter washing the x-metal free phthalocyanine with a basic solution comprised of methanol and ammonium hydroxide or methanol and sodium hydroxide and a ketone solvent.

2. A process for the preparation of x-metal free phthalocyanine for electrophotographic imaging which consists essentially of (i) initially preparing a mixture of alpha- and x-metal free phthalocyanines from alpha-phthalocyanine with grinding or milling at about 25° C. (ii) converting the mixture comprised of from about 15 to 60 percent of x-metal free phthalocyanine and 85 to 40 percent of alpha metal free phthalocyanine to x-metal free phthalocyanine by the addition of an organic solvent; (iii) separating the x-metal free phthalocyanine therefrom, and thereafter washing the x-metal free phthalocyanine with a basic solution of methanol and sodium hydroxide or of methanol and ammonium hydroxide and a ketone solvent.

3. A process in accordance with claim 2 wherein the mixture obtained from the initial grinding contains from about 15 to about 90 weight percent of x-metal free phthalocyanine.

4. A process in accordance with claim 2 wherein the grinding device is an attritor.

5. A process in accordance with claim 2 wherein the solvent is methyl ethyl ketone.

6. A process in accordance with claim 2 wherein the basic solution is comprised of methanol and ammonium hydroxide.

7. A process in accordance with claim 2 wherein the basic solution is comprised of methanol and sodium hydroxide.

8. A process in accordance with claim 2 wherein the solvent is added in an amount of from about 5 to about 40 weight percent.

9. A process in accordance with claim 2 wherein there results an x-metal free phthalocyanine of a purity exceeding 90 percent.

10. A process in accordance with claim 2 wherein there is obtained an x-metal free phthalocyanine product in a yield greater than about 95 percent.

11. A process in accordance with claim 2 wherein subsequent to washing the product resulting is dried.

12. A process for the preparation of x-metal free phthalocyanine for electrophotographic imaging which consists essentially of (i) initially preparing a mixture of alpha- and x-metal free phthalocyanines from alpha-phthalocyanine with a grinding device 25° C.; (ii) converting the mixture comprised of from about 15 to 90 percent of x-metal free phthalocyanine and 85 to 10 percent of alpha-metal free phthalocyanine to x-metal free phthalocyanine by the addition of an organic solvent of methyl ethyl ketone or cyclohexanone; (iii) separating the x-metal free phthalocyanine therefrom, and thereafter washing the x-metal free phthalocyanine with a basic solution of methanol and ammonium hydroxide or methanol and sodium hydroxide and an organic solvent of methyl ethyl ketone or cyclohexanol.

13. A process in accordance with claim 2 wherein there is formed the x-metal free phthalocyanine in a period of about 3 hours.

14. A process in accordance with claim 2 wherein subsequent to washing the x-metal free phthalocyanine is dried by heating.

15. A process in accordance with claim 14 wherein drying is accomplished at about 70° C. for about 8 hours in a vacuum oven.

* * * * *